(12) United States Patent
Romme

(10) Patent No.: US 11,184,048 B2
(45) Date of Patent: Nov. 23, 2021

(54) SYSTEM AND METHOD FOR DISTANCE AND VELOCITY ESTIMATION IN PHASE-BASED RANGING

(71) Applicant: Stichting IMEC Nederland, Eindhoven (NL)

(72) Inventor: Jac Romme, Schiedam (NL)

(73) Assignee: Stichting IMEC Nederland, Eindhoven (NL)

( * ) Notice: Subject to any disclaimer, the term of this patent is extended or adjusted under 35 U.S.C. 154(b) by 0 days.

(21) Appl. No.: 16/899,976

(22) Filed: Jun. 12, 2020

(65) Prior Publication Data

US 2020/0395978 A1 Dec. 17, 2020

(30) Foreign Application Priority Data

Jun. 12, 2019 (EP) ..................................... 19179645

(51) Int. Cl.
*H04B 1/7156* (2011.01)
*G01S 13/84* (2006.01)

(52) U.S. Cl.
CPC ............ *H04B 1/7156* (2013.01); *G01S 13/84* (2013.01)

(58) Field of Classification Search
CPC .. G01S 13/38; G01S 11/02; G01S 5/14; G01S 13/84; G01S 19/44; G01S 13/343; G01S 13/931; G01S 7/354; G01S 19/43; G01S 2007/356; G01S 13/584; G01S 1/02; G01S 11/026; G01S 11/08; G01S 13/34; G01S 13/36; G01S 13/42; G01S 5/0294;
(Continued)

(56) References Cited

U.S. PATENT DOCUMENTS 2,013 A 3/1841 Howe
6,243,587 B1 * 6/2001 Dent .......................... G01S 5/06
342/457

(Continued)

FOREIGN PATENT DOCUMENTS

DE 202008018084 U1 10/2011
WO 2019052687 A1 3/2019

OTHER PUBLICATIONS

European Search Report, Application No. 19179645.7, dated Dec. 5, 2019, 7 pages.

*Primary Examiner* — Golam Sorowar
(74) *Attorney, Agent, or Firm* — McDonnell Boehnen Hulbert & Berghoff LLP

(57) ABSTRACT

A measuring system includes a first measuring device and a second measuring device. The measuring system is configured to, between the first measuring device and the second measuring device, determine a first phase shift at a first frequency, determine a second phase shift at a second frequency, and determine a third phase shift at a third frequency. The first measuring device includes a phase difference calculator configured to calculate a first phase difference between the first phase shift and the second phase shift, and a second phase difference between the second phase shift and the third phase shift. The first measuring device also includes a range/velocity calculator configured to determine a first biased distance estimate from the first phase difference, a second biased distance estimate from the second phase difference, and an unbiased distance and/or velocity from the first biased distance estimate and the second biased distance estimate.

20 Claims, 6 Drawing Sheets

(58) Field of Classification Search
CPC .. G01S 5/06; G01S 5/10; H04W 4/02; H04W 4/029; H04W 64/00; H04W 4/025; H04W 56/001; H04W 64/006; H04W 24/08; H04W 28/04; H04W 56/0035; H04W 64/003; H04W 4/023; H04W 84/047; H04W 8/08; H04B 17/27; H04B 17/318; H04B 17/373; H04B 17/391; H04B 10/6164; H04B 10/65; H04B 17/21; H04B 17/24; H04B 17/309; H04B 17/327; H04B 17/3913; H04B 1/005; H04B 1/48; H04B 5/0056; H04B 5/0062; H04B 7/0408; H04B 7/0413; H04B 7/0682; H04B 7/10; H04B 7/155
See application file for complete search history.

(56) References Cited

U.S. PATENT DOCUMENTS

| | | | |
|---|---|---|---|
| 6,731,908 B2 | 5/2004 | Berliner et al. | |
| 2009/0243932 A1* | 10/2009 | Moshfeghi | G01S 13/38 342/378 |
| 2012/0122485 A1 | 5/2012 | Bartlett | |
| 2014/0184447 A1 | 7/2014 | Zhou et al. | |
| 2014/0248841 A1 | 9/2014 | Kluge et al. | |
| 2016/0069676 A1* | 3/2016 | Alsindi | G01S 19/00 702/94 |
| 2020/0241105 A1* | 7/2020 | Marshall | G01S 5/06 |

* cited by examiner

180
SYSTEM AND METHOD FOR DISTANCE AND VELOCITY ESTIMATION IN PHASE-BASED RANGING

CROSS-REFERENCE TO RELATED APPLICATIONS

The present application is a non-provisional patent application claiming priority to EP Application No: EP 19179645.7, filed Jun. 12, 2019, the contents of which are hereby incorporated by reference.

FIELD OF THE DISCLOSURE

The disclosure provided herein relates to phase-based ranging, particularly for distance and velocity estimation between wirelessly communicating devices.

BACKGROUND

For determining a range between communications devices, numerous approaches may be used. For example, the latency of a communication may be used as an indication of time of flight and therefore of distance. This type of measurement may require large bandwidths, which is not compatible with narrowband radio like Bluetooth or 802.15.4/ZigBee.

Also, a phase-based ranging approach may be used. In these examples, the phase-shift of wirelessly transmitted signals between transmission and reception is used as an indicator of distance. This approach may result in a relative movement of the devices that can lead to an additional phase shift due to the changing distance and due to Doppler-shift. This additional phase-shift may result in a distance error.

Accordingly, it would be desirable to provide a ranging and velocity estimation system and method, which allow for a low measuring time, while at the same time achieving a high accuracy which can be used with a wide variety of radio systems.

SUMMARY

Aspects of the embodiments disclosed herein include or relate to providing a ranging and velocity estimation system and method. The ranging and velocity estimation system and method allow for a low measuring time, while also achieving a high accuracy, and can be used with a wide variety of radio systems.

An example measuring system includes a first measuring device and a second measuring device. The measuring system is configured to, between the first measuring device and the second measuring device, determine a first phase shift at a first frequency, determine a second phase shift at a second frequency, and determine a third phase shift at a third frequency. The first measuring device includes a phase difference calculator, configured to calculate a first phase difference between the first phase shift and the second phase shift, and to calculate a second phase difference between the second phase shift and the third phase shift.

Within examples, the first measuring device includes a range/velocity calculator configured to determine a first biased distance estimate from the first phase difference, to determine a second biased distance estimate from the second phase difference, and to determine an unbiased distance and/or velocity from the first biased distance estimate and the second biased distance estimate. This allows for an understandable measure of the interactivity of a connection.

Alternatively, the range/velocity calculator is configured to determine the unbiased distance from the first phase difference and the second phase difference directly.

The measuring system is configured to determine the first phase shift, the second phase shift, and the third phase shift as roundtrip phase shifts between the first measuring device and the second measuring device.

Within examples for determining the first phase shift, the first measuring device is configured to transmit a first measuring signal at a first frequency to the second measuring device, the second measuring device is configured to determine a first partial phase shift, the first measuring signal has undergone during transmission, the second measuring device is configured to transmit a second measuring signal at the first frequency to the first measuring device, the first measuring device is configured to determine a second partial phase shift, the second measuring signal has undergone during transmission, and the phase difference calculator is configured to determine the first phase shift by adding the first partial phase shift and the second partial phase shift.

Additionally or alternatively, for determining the second phase shift, the first measuring device is configured to transmit a third measuring signal at the second frequency to the second measuring device, the second measuring device is configured to determine a third partial phase shift, the third measuring signal has undergone during transmission, the second measuring device is configured to transmit a fourth measuring signal at the second frequency to the first measuring device, the first measuring device is configured to determine a fourth partial phase shift, the fourth measuring signal has undergone during transmission, and the phase difference calculator is configured to determine the second phase shift by adding the third partial phase shift and the fourth partial phase shift.

Additionally or alternatively, for determining the third phase shift, the first measuring device is configured to transmit a fifth measuring signal at the third frequency to the second measuring device, the second measuring device is configured to determine a fifth partial phase shift, the fifth measuring signal has undergone during transmission, the second measuring device is configured to transmit a sixth measuring signal at the third frequency to the first measuring device, the first measuring device is configured to determine a sixth partial phase shift, the sixth measuring signal has undergone during transmission, and the phase difference calculator is configured to determine the third phase shift by adding the fifth partial phase shift and the sixth partial phase shift. This allows for an efficient calculation of the phase values.

Within examples for determining the first phase shift, the second measuring device is configured to transmit the second partial phase shift to the first measuring device. Additionally or alternatively, for determining the second phase shift, the second measuring device is configured to transmit the fourth partial phase shift to the first measuring device. Additionally or alternatively, for determining the third phase shift, the second measuring device is configured to transmit the sixth partial phase shift to the first measuring device. This allows a calculation of the interactivity at a single measuring device.

Within examples, the first measuring device is configured to transmit the third measuring signal a first time period $T_1$ after transmitting the first measuring signal. Additionally or alternatively, the second measuring device is configured to transmit the fourth measuring signal the first time period $T_1$ after transmitting the second measuring signal. Additionally or alternatively, the first measuring device is configured to transmit the fifth measuring signal a second time period $T_2$ after transmitting the third measuring signal. Additionally or alternatively, the second measuring device is configured to transmit the sixth measuring signal the second time period $T_2$ after transmitting the fourth measuring signal. This allows flexible determinations of the phase values.

Within examples, the first measuring signal and/or the second measuring signal and/or the third measuring signal are continuous wave signals or inphase/quadrature, I/Q, signals. The use of continuous wave signals allows for an example implementation. The use of I/Q signals allows for mitigating the effects of reflections.

Within examples, the range/velocity calculator includes a distance estimator, configured to determine the first biased distance estimate, as follows:

$$\hat{d}_1 = \frac{C_0}{-4\pi\Delta_f}\Delta_{\phi_1}.$$

Additionally or alternatively, the range/velocity calculator is configured to determine the second biased distance estimate, as follows:

$$\hat{d}_2 = \frac{C_0}{-4\pi\Delta_f}\Delta_{\phi_2}$$

wherein, $\hat{d}_1$ is the first biased distance estimate, $\hat{d}_2$ is the second biased distance estimate, $\Delta f$ is a frequency spacing between the first frequency and the second frequency as well as between the second frequency and the third frequency, $C_0$ is the speed of light in vacuum, $\Delta_{\phi 1}$ is the first phase difference, $\Delta_{\phi 2}$ is the second phase difference. This allows for an efficient manner of determining the phase estimates.

Within examples, the range/velocity calculator includes a bias remover, configured to determine the unbiased distance and/or velocity from the first biased distance estimate and the second biased distance estimate, by solving the following equations for unbiased distance and velocity:

$$\hat{d}_1 \approx d + \frac{f_c}{\Delta_1}T_1V,$$

$$\hat{d}_2 \approx d + T_1V + \frac{f_c}{\Delta_2}T_2V.$$

wherein, d is the unbiased distance at the start of the measurement procedure, v is the velocity, $f_c$ is a carrier frequency, $T_1$ is a time difference between measuring at the first frequency and at the second frequency, $T_2$ is a time difference between measuring at the second frequency and at the third frequency, $\Delta_1$ is a difference of the first frequency and the second frequency, $\Delta_2$ is a difference of the second frequency and the third frequency, $\hat{d}_1$ is the first biased distance estimate, and $\hat{d}_2$ is the second biased distance estimate. This allows for an efficient calculation of the velocity and distance.

Within examples, the range/velocity calculator is configured to determine the unbiased distance and/or velocity from the first biased distance estimate and the second biased distance estimate, as follows:

$$d \approx \frac{\left(T_1 + \frac{f_c}{\Delta_2}T_2\right)\hat{d}_1 - \frac{f_c}{\Delta_1}T_1\hat{d}_2}{T_1 + \frac{f_c}{\Delta_2}T_2 - \frac{f_c}{\Delta_1}T_1}$$

$$v \approx \frac{\hat{d}_2 - \hat{d}_1}{T_1 + \frac{f_c}{\Delta_2}T_2 - \frac{f_c}{\Delta_1}T_1}$$

This allows for an efficient calculation of the velocity and distance.

Within examples, the measuring system is configured to, between the first measuring device and the second measuring device, determine a plurality phase shifts, each at a different frequency. The phase difference calculator is then configured to calculate a plurality of phase differences, each of two frequency-adjacent phase shifts of the plurality phase shifts. The range/velocity calculator is configured to calculate a plurality of biased distance estimates, each from one of the plurality of calculated phase differences. This may increase an accuracy of the distance estimates.

Within examples, the range/velocity calculator is configured to determine the unbiased distance and/or velocity from the plurality of biased distance estimates, by performing an error minimization or a matching algorithm. This may increase an accuracy of the distance estimates.

Within examples, the measuring system is configured to step through the different frequencies for determining the plurality phase shifts by a pre-defined or user-selectable frequency pattern. This allows for flexible adaptation of the measuring system to different standards.

Within examples, the frequency pattern is a monotonous frequency rise, or a monotonous frequency fall, or an alternation between higher and lower frequencies, or a pseudo-random frequency order. This allows for furthers gains in accuracy.

A ranging method, includes the following steps:
  determining a first phase shift at a first frequency, between the first measuring device and the second measuring device,
  determining a second phase shift at a second frequency, between the first measuring device and the second measuring device,
  determining a third phase shift at a third frequency, between the first measuring device and the second measuring device,
  calculating a first phase difference between the first phase shift and the second phase shift,
  calculating a second phase difference between the second phase shift and the third phase shift,
  determining a first biased distance estimate from the first phase difference, and
  determining a second biased distance estimate from the second phase difference.

Within examples, the ranging method includes determining an unbiased distance and/or velocity from the first biased distance estimate and the second biased distance estimate. This allows for an understandable measure of the interactivity of a connection. Alternatively, the unbiased distance is calculated from the first phase difference and the second phase difference directly.

A computer program with a program code for performing the previously-described method when the computer program runs on a computer or a processor. This allows for an understandable measure of the interactivity of a connection.

Exemplary and non-limiting embodiments of the disclosure are now further explained with respect the drawings, in which

BRIEF DESCRIPTION OF THE FIGURES

The above, as well as additional, features will be better understood through the following illustrative and non-limiting detailed description of example embodiments, with reference to the appended drawings.

All the figures are schematic, not necessarily to scale, and generally only show parts which are necessary to elucidate example embodiments, wherein other parts may be omitted or merely suggested.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

Figure 1:
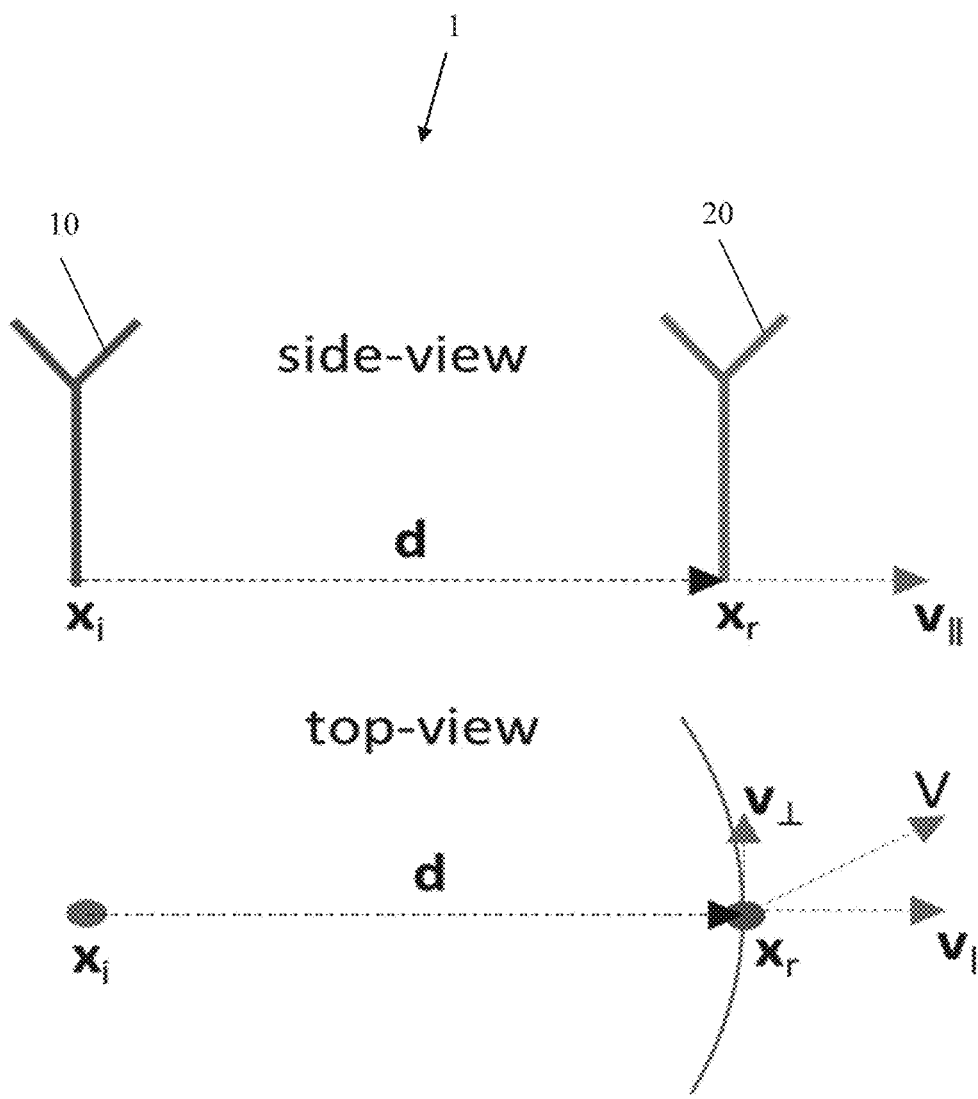
FIG. 1 shows a first embodiment of a measuring system as an overview, according to an example embodiment.

First, an underlying program and corresponding functions of an embodiment of the measuring system depicted in FIG. 1 are described. With regard to FIG. 2-FIG. 5, the detailed construction and function of different embodiments of the measuring system are shown. Finally, FIG. 8 depicts the function of an embodiment of the measuring method is shown in detail. Similar entities and reference numbers in different figures have been partially omitted.

FIG. 1 depicts a first embodiment of the measuring system 1. The measuring system 1 includes a first measuring device 10 and a second measuring device 20. In practice, the first measuring device 10 and the second measuring device 20 can for example be mobile telephones, computers, smart tags, etc.

In the following, the measuring devices 10, 20 will also be referred to as transceivers. The first measuring device will also be referred to as initiator while the second measuring device 20 will also be referred to as reflector.

At the start of the ranging procedure at a time to, the first measuring device 10 is located at a position $x_i$ and the second measuring device 20 is located at a position $x_r$. They are separated by a distance-vector d. d is therefore defined as $d=x_i-x_r$, such that the distance d is the Euclidean norm of d.

For simplicity, it is assumed that only the reflector is moving in time, which is described by the velocity-vector v. The velocity-vector can be decomposed into two parts; one part is parallel to the distance vector d and the other part perpendicular to the distance-vector, which will be denoted by $v_\parallel$ and $v_\perp$, respectively. In other words, $v_\parallel$ is the component describing the motion in the direction perpendicular to circle/sphere around the initiator with radius d and thus of dimension 1 and therefore denoted as a scalar. The perpendicular movement $v_\perp$ will be 2-dimensional.

In practice, the typical velocity of movement can be in the order of walking velocity, i.e. in the order of 1-2 m/s or 3.6-7.2 km/h. Please note that rotation of the mobile target is not included. The measurement duration can be in the order of 40-50 milliseconds, which means that during the measurements the displacement is 8-10 cm.

Due to the small displacement during measurement, it is assumed that $v_\parallel$ is constant during the whole ranging procedure. To evaluate the impact of movement in a scenario without multipath, only $v_\parallel$ is of relevance. Only this component will namely modify the distance. In this case, the distance d as function of time is given by $$d(t) = d + v_\parallel t = |d| + \frac{d \cdot v}{|d|} t \quad (1)$$

where $\|\,\|$ and • denote the Euclidean norm and scalar-product/inner-product, respectively.

In other words, the propagation delay of the LOS component can be written as, $$\tau(t) = \frac{d + v_\parallel t}{c_0} \quad (2)$$

where $c_0$ is the speed of light in vacuum/air. As a result, the frequency domain channel response at time t in a pure LOS scenario can be written as:

$$H(f, t) = a_0 \exp(-j2\pi f \tau(t)) = a_0 \exp\left(\frac{-j2\pi f d}{c_0}\right) \exp\left(\frac{-j2\pi f v_\parallel t}{c_0}\right) \quad (3)$$

where d is the distance at t=0 (at the start of the ranging procedure). The first complex exponential models the static part, while the second models the time-variant channels/doppler. Due to the typically small displacement—smaller than 10 cm—during the ranging procedure, it can be assumed that the amplitude $a_0$ as constant. As a result, the displacement during ranging only modulates the phase, which in practice may be relatively slow. At for example 2.4 GHz, the wavelength is 12.5 cm. The displacement is thus smaller than 1 wavelength, meaning less than one additional phase rotation due to movement is to be expected. However, it should be noted that the displacement is still considered in the calculation.

Due to the time-dependency, the duration of the sequence of events during the ranging procedure is of relevance. It is assumed that the ranging procedure uses $K_f$ tones, where the frequency of the k-th tone generated by the reflector will be denoted by $f_k$, such that:

$$f_k = f_b k \Delta_f \quad (4)$$

with $\Delta_f$ denoting the frequency step size and $f_b$ denoting the lowest channel being used.

Each tone will have a duration $T_f$ during which both the initiator and reflector will take a phase/IQ-sample. The time at which the k-th sample is taken by the reflector or initiator will be denoted by $t_k$ and $t'_k$, respectively.

$$t_k = t_0 + kT_f, t'_k = t'_0 kT_f \quad (5)$$

A graphical impression of the timing is later shown in FIG. 4.

After combining the phases measured at the initiator and reflector, the result is:

$$\phi_{2w}[k] = \varphi_k(t_k, t'_k) \approx \frac{-4\pi f_k}{c_0}(d + v_\| \bar{t}_k) \quad (6)$$

where $\bar{t}_k = \frac{1}{2}(t_k\, t'_k)$ and shows that the measured two-way phase depends mainly on the distance at the average time at which both phase measurements for the k-th tone are taking place. Using a phase-difference approach of two subsequent tones provides insight in the impact on the distance estimate, while the results are also valid for super-resolution approaches. Using this approach, the distance estimate becomes:

$$\hat{d}_k = \frac{c_0}{-4\pi\Delta_f}(\phi_{2w}[k+1] - \phi_{2w}[k]) = \quad (7)$$

$$\frac{1}{\Delta_f}(f_{k+1}(d + v_\|\bar{t}_{k+1}) - f_k(d + v_\|\bar{t}_k)) =$$

$$\frac{f_{k+1} - f_k}{\Delta_f}d + \frac{1}{\Delta_f}(f_{k+1}v_\|\bar{t}_{k+1} - f_k v_\|\bar{t}_k)$$

where $\bar{t}_{k+1} = \bar{t}_k + T_f$ and $f_{k+1} = f_k + \Delta_f$ is used to obtain $$\hat{d}_k = d + \frac{1}{\Delta_f}((f_k + \Delta_f)v_\|(\bar{t}_k + T_f) - f_k v_\|\bar{t}_k) = \quad (8)$$

$$d + \frac{1}{\Delta_f}(f_k v_\|\bar{t}_k + f_k v_\| T_f + \Delta_f v_\|\bar{t}_k + \Delta_f v_\| T_f - f_k v_\|\bar{t}_k) =$$

$$d + \frac{1}{\Delta_f}(f_k v_\| T_f + \Delta_f v_\|\bar{t}_k + \Delta_f v_\| T_f) =$$

$$d + v_\|\bar{t}_k + \frac{1}{\Delta_f}(f_k v_\| T_f + \Delta_f v_\| T_f) \approx$$

$$d + kT_f v_\| + \frac{f_k}{\Delta_f}T_f v_\| \approx d + \frac{f_k}{\Delta_f}T_f v_\| = d + \psi v_\|$$

where the last term in the approximation is dominant due to the leverage-effect created by the division of absolute frequency compared to the frequency step-size, making the last term larger than for instance the second term, as k is smaller than $$\frac{f_k}{\Delta_f}.$$

When extending the frequency step-size to multiple tones, such that $\psi = f_c T_f/\Delta_f$, where $f_c$ is the center frequency of the band used, the result shows that doppler introduces a bias to the ranging estimate.

It can be concluded that by changing the order of tones during the phase-based ranging, the bias introduced by velocity can change sign as well. Changing the order of tones from one ranging procedure to the next can allow for improved observability of distance and velocity in the context of tracking.

In an example scenario, a mobile agent is moving in the environment such that each time t has a distance d(t) with the destination (initiator) and moves towards the destination with a velocity v(t), which can be constant. Time-uniform ranging updates with the sampling time $T_s$, are obtained for the phase based ranging system, such that the discrete time process model of such a system would be:

$$x_{k+1} = A\, x_k + n \quad (9)$$

where $x_k = [d_k, v_k]^T$ is the state vector at sample k and $n = N(0, C_p)$ is the process noise, which can be a zero mean white Gaussian noise with covariance of $C_p$ $$A = \begin{bmatrix} 1 & T_s \\ 0 & 1 \end{bmatrix}$$

is the corresponding process matrix.

The output $z_k$ of the measurement system at sample k is an observation of distance including the doppler effect, i.e.

$$\hat{z}_k = d_k + \psi_k v_k + \xi_k = H_k x_k \quad (10)$$

where $\psi_k$ is the doppler effect factor, i.e. $\psi_k \in \{-\alpha, +\alpha\}$, $H_k = [1\ \psi_k]$ is the observation matrix and $\xi_k = N(0, \sigma_z^2)$ is the measurement noise which is supposed to be zero-mean and normally distributed with variance equal to $\sigma_z^2$.

Distance and velocity can be estimated from a finite number of observations with some degree of accuracy. Therefore, the process noise v is assumed to be zero, such that the observability in relation to the measurement matrix can be analyzed.

In an example scenario, K number of observations from time instant 1 to K, i.e. $\{\hat{z}_k | k \in [1: K]\}$ are obtained. At each time instant k, $\hat{z}_k$ can be defined not only as a function of the state at time k, (equation (10)), but also as a function of the state at any time in the past or the future. For instance:

Past: $\hat{z}_k = H_k x_k + \xi_k = H_k A x_{k-1} + \xi_k = H_k A^2 x_{k-2} + \xi_k = H_k A^y x_{k-y} + \xi_k$ Future: $\hat{z}_k = H_k x_k + \xi_k = H_k A^{-1} x_{k+1} + \xi_k = H_k A^{-y} x_{k-y} + \xi_k$ (11)

Hence, the set of all observations can be defined as a function of the state at a desired time instant $\tau$.

$$\hat{z}_1 = H_1 A^{1-\tau} x_\tau + \xi_1$$

$$\hat{z}_2 = H_2 A^{2-\tau} x_\tau + \xi_2$$

$$\vdots$$

$$\hat{z}_K = H_K A^{K-\tau} x_\tau \xi_K \quad (12)$$

As a result, the state $x_\tau$ can be estimated using all the observations $\{\hat{z}_k | k \in [1: n]\}$. Let's define the vectors of observations as:

$$\hat{z} = [\hat{z}_1, \hat{z}_2, \ldots, \hat{z}_K]^T \quad (13)$$

and $$\tilde{H}_\tau = \begin{bmatrix} H_1 A^{1-\tau} \\ H_2 A^{2-\tau} \\ \ldots \\ H_K A^{K-\tau} \end{bmatrix} \quad (14)$$

and

-continued $$\xi = [\xi_1, \xi_2, \ldots, \xi_K]^T \quad (15)$$

such that $$\tilde{z} = \tilde{H}_\tau x_\tau + \xi \quad (16)$$

Given the observations from time instant 1 to K, an estimate can be represented for $x_\tau$ by solving a linear least square error calculation resulting in:

$$\hat{x}_\tau = [(\tilde{H}_\tau)^T (R)^{-1} \tilde{H}_\tau]^{-1} \tilde{H}_\tau^T (R)^{-1} \tilde{z} \quad (17)$$

where $R = \sigma_n^2 I_{K,K}$ is the covariance matrix of measurement noise. Equation (17) is solvable only if $[(\tilde{H}_\tau)^T (R)^{-1} \tilde{H}_\tau]$ is invertible.

If $\Pi_\tau$ is defined as $\Pi_\tau = \sigma_n^{-2} \tilde{H}_\tau^T \tilde{H}_\tau \Pi_\tau$ is the inverse of the covariance of the least square error estimation of $X_\tau$, i.e. $E[\hat{x}_\tau \hat{x}_\tau^H]$ Hence, $\Pi_\tau$ not only provides information of whether the calculation is solvable, but also gives an overview of the estimation precision. The following calculations result in the following:

$$\tilde{H}_\tau = \begin{bmatrix} 1 & (1-\tau)T_s + \psi_1 \\ 1 & (2-\tau)T_s + \psi_2 \\ \vdots & \\ 1 & (K-\tau)T_s + \psi_n \end{bmatrix} \quad (18)$$

such that $$\Pi_\tau = 1/\sigma_n^2 \begin{bmatrix} K & \sum_{k=1}^{K} (k-\tau)T_s + \psi_k \\ \sum_{k=1}^{K} (k-\tau)T_s + \psi_k & \sum_{k=1}^{K} ((k-\tau)T_s + \psi_k)^2 \end{bmatrix} \quad (19)$$

whose invertibility depends on various parameters. For instance, if K=1, the result is:

$$\Pi_\tau = 1/\sigma_n^2 \begin{bmatrix} 1 & (1-\tau)T_s + \psi_1 \\ (1-\tau)T_s + \psi_1 & ((1-\tau)T_s + \psi_1)^2 \end{bmatrix}$$

which has rank 1 and hence, is not invertible. Because there is only one measurement of distance, velocity is not observable.

For larger number of observations, although the system is observable, the richness of observations depends on all parameters, $T_s$, n, τ, ψk. As eigenvalues of $\Pi_\tau$ decrease, the system observability may become more marginal (poorer).

Figure 2:
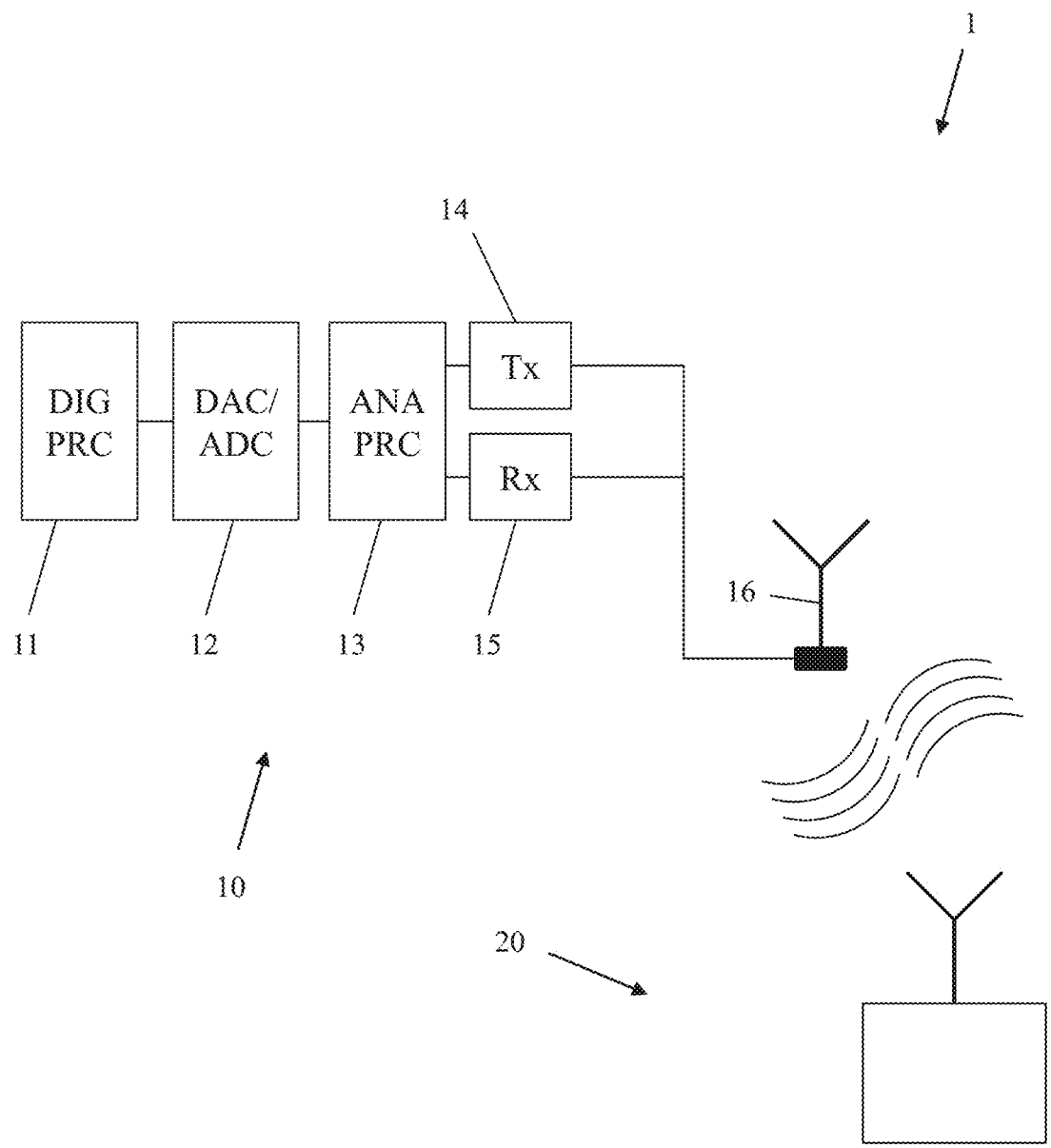
FIG. 2 shows a second embodiment of the measuring system in a block diagram, according to an example embodiment.

In FIG. 2, a more detailed embodiment of the measuring system 1 is shown. Here, details of the first measuring device 10 are shown. The second measuring device 20 can be constructed in a similar manner.

The first measuring device 10 includes a digital processor 11 connected to a digital-analog-converter/analog-digital-converter 12. The digital-analog-converter/analog-digital-converter 12 is connected to an analog processor 13, which is connected to a transmitter 14 and to a receiver 15. The transmitter 14 as well as the receiver 15 are both connected to an antenna 16.

When performing a range measurement, the first measuring device 10 and the second measuring device 20 may first perform a handshake in order to agree upon a frequency and timing scheme for performing the measurements. This is performed by exchanging signals containing the information necessary for the handshake by the first measuring device 10 and the second measuring device 20. After performing this handshake, measuring signals are exchanged. Phase information is extracted from these measuring signals and processed.

The digital processor 11 can generate a digital measuring signal, for example a digital continuous wave measuring signal or a digital in-phase/quadrature-signal (I/Q-signal). This digital measuring signal is handed on to the digital-analog-converter/analog-digital-converter 12, and thereby converted to an analog measuring signal. The signal is handed on to the analog processor 13, which performs further analog processing on it, for example a frequency conversion to a transmission frequency. A resulting radio frequency measuring signal is handed on to the transmitter 14, which transmits the signal using the antenna 16 to the second measuring device 20. The second measuring device 20 receives the signal and extracts the phase information therefrom. The second measuring device 20 determines the phase shift from transmitting the measuring signal by the first measuring device 10 until receiving the measuring signal by the second measuring device 20.

Measurements in the opposite direction may also be performed. In this case, the second measuring device 20 generates and transmits a corresponding measuring signal, which is then received by the antenna 16 and the receiver 15 of the first measuring device 10. The signals handed on to the analog processor 13, which performs analog processing, for example, a frequency is converted to an intermediate frequency. The resulting signal is handed on to the digital-analog-converter/analog-digital-converter 12, which digitizes the signal and hands it on to the digital processor 11. The digital processor 11 extracts the phase information from this signal. The extracted phase information indications how large the phase shift was from transmitting the measuring signal by the second measuring device to receiving the signal by the first measuring device 10.

Using the same processing chain, the phase information determined by the respective measuring device 10, 20 can be transmitted to the other measuring device 20, 10. The phase information determined by the second measuring device 20 based upon the transmission of the first measuring device 10 is transmitted back to the first measuring device 10, so that the first measuring device 10 can determine a round trip phase shift.

Figure 3:
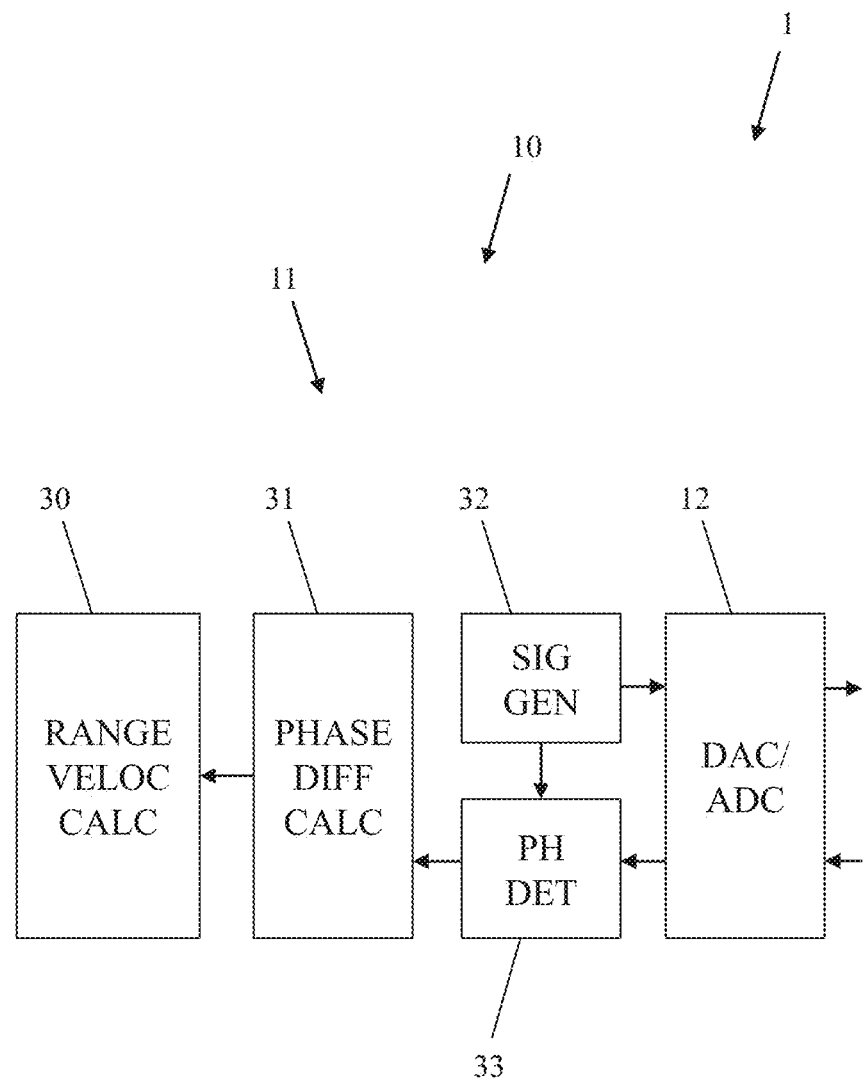
FIG. 3 shows a detail of a third embodiment of the measuring system, according to an example embodiment.

In FIG. 3, further details regarding the inner construction of the digital processor 11 of the first measuring device 10 are provided. The digital processor 11 includes a range/velocity calculator 30 connected to a phase difference calculator 31, which is connected to a phase determiner 33. The phase determiner 33 is connected to a signal generator 32. The signal generator 32 as well as the phase determiner 33 are both connected to the digital-analog-converter/analog-digital-converter 12, described with respect to FIG. 2.

The transmitter 14 and the receiver 15 of FIG. 2 can share a local oscillator to ensure phase coherence between the transmitted and the received signals. This is also applicable to the signal generator 32 and the phase determiner 33 of FIG. 3.

When transmitting a signal, the signal generator 32 generates the digital measuring signal and hands it on to the digital-analog-converter/analog-digital-converter 12. The phase information of this signal is handed on to the phase determiner 33. In practice, this may also be realized by using a single local oscillator signal both for TX and RX and the fact that up and down-mixing results in opposite signs for the initial phase of the local oscillators, which thus cancel when the partial phase-shift are summed. The signal passes the transmission chain, as described with respect to FIG. 2 and is received by the second measuring device 20. The second measuring device determines the phase information from the measuring signal and transmits it back to the first measuring device 10. This phase information is extracted from the signal by the phase determiner 33. Together with the initial phase information of the measuring signal provided by the signal generator 32, the phase determiner 33 determines a first partial phase shift from this measuring signal.

The second measuring device 20 also transmits a measuring signal to the first measuring device 10. This measuring signal is received through the reception chain as described with respect to FIG. 2. It is passed on to the phase determiner 33, which determines phase information from this second measuring signal. The initial phase information of the second measuring signal is provided to the first measuring device by the second measuring device. It is extracted by the phase determiner 33. The phase determiner 33 therefore determines a second partial phase shift from the second measuring signal. The first partial phase shift and the second partial phase shift are handed on to the phase difference calculator 31, which calculates a first phase shift as a sum of the first partial phase shift and the second partial phase shift.

The before-described process is repeated for a number of frequencies. At least three tones can be measured. The phase difference calculator 31 therefore at least determines a second phase difference. The phase differences are then handed on to the range/velocity calculator 30, which determines a biased distance estimate from each determined phase shift and a third phase shift. The phase difference calculator 31 then calculates a first phase difference as the difference between the first phase shift and the second phase shift and a second phase difference as the difference between the second phase shift and the third phase shift.

A first biased distance estimate is calculated as follows:

$$\hat{d}_1 = \frac{C_0}{-4\pi\Delta_f}\Delta_{\phi_1}$$

A second biased distance estimate is calculated as follows:

$$\hat{d}_2 = \frac{C_0}{-4\pi\Delta_f}\Delta_{\phi_2}$$

wherein $\hat{d}_1$ is the first biased distance estimate, $\hat{d}_2$ is the second biased distance estimate, $\Delta f$ is a frequency spacing between the first frequency and the second frequency as well as between the second frequency and the third frequency, $C_0$ is the speed of light in vacuum, $\Delta_{\phi_1}$ is the first phase difference, $\Delta_{\phi_2}$ is the second phase difference.

The range velocity calculator 30 then determines an unbiased distance and/or velocity from the biased distance estimates by solving an equation system given by all biased distance estimates.

In the case of two biased distance estimates, the equation system includes the following equations:

$$\hat{d}_1 \approx d + \frac{f_c}{\Delta_1}T_1 V$$

$$\hat{d}_2 \approx d + T_1 V + \frac{f_c}{\Delta_2}T_2 V$$

wherein d is the unbiased distance at the start of the measurement procedure, v is the velocity, fc is a carrier frequency, T1 is a time difference between measuring at the first frequency and at the second frequency, T2 is a time difference between measuring at the second frequency and at the third frequency, $\Delta 1$ is a difference of the first frequency and the second frequency, $\Delta 2$ is a difference of the second frequency and the third frequency, $\hat{d}_1$ is the first biased distance estimate, and $\hat{d}_2$ is the second biased distance estimate.

In this case, the solution reads as follows:

$$d \approx \frac{\left(T_1 + \frac{f_c}{\Delta_2}T_2\right)\hat{d}_1 - \frac{f_c}{\Delta_1}T_1\hat{d}_2}{T_1 + \frac{f_c}{\Delta_2}T_2 - \frac{f_c}{\Delta_1}T_1}$$

$$v \approx \frac{\hat{d}_2 - \hat{d}_1}{T_1 + \frac{f_c}{\Delta_2}T_2 - \frac{f_c}{\Delta_1}T_1}$$

Figure 4:
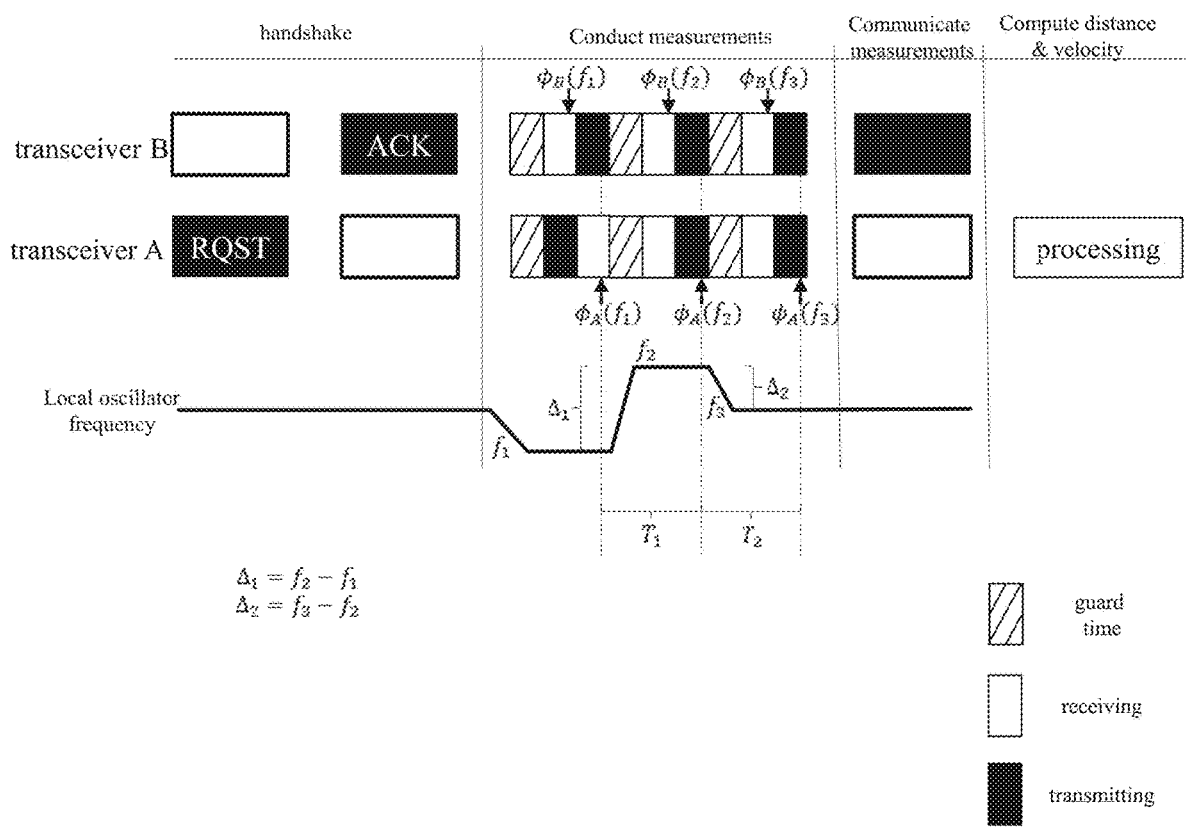
FIG. 4 shows details of operation of a fourth embodiment of the measuring system, according to an example embodiment.

In FIG. 4, further details of a ranging measurement by a fourth embodiment of the measuring system are given. Here, the different phases of the measurement are shown as columns.

In the top, the situation of a transceiver B, corresponding to the reflector or second measuring device 20 is shown, while in the middle, the situation of a transceiver A, the initiator, or the first measuring device 10 is shown. In the bottom, a current local oscillator frequency, corresponding to the frequency of the measuring signal is shown.

During an initial handshake stage, both measuring devices 10, 20 agree on the timing and frequency parameters to be used. This phase can also be used to conduct frequency offset estimation and compensation as well as symbol-level accurate time-alignment and determining of a proper gain of a reception stage. This phase can be optional because, for example, pre-specified parameters may be used. While handshaking, the first measuring device transmits a request, which is then acknowledged by the second measuring device 20.

To obtain an estimate for both the distance and velocity between both devices, both the first measuring device 10 and the second measuring device 20 will conduct three phase measurements, as depicted. At each frequency, both the first measuring device 10 and the second measuring device 20 successively transmit and receive a measuring signal. A guard time can be included to ensure a stabilized phase during the measurements. A frequency change is timed to occur during the guard time.

After a first guard time, the first measuring device 10 transmits a measuring signal at frequency $f_1$, which is received by the second measuring device 20 resulting in the second measuring device 20 determining a first partial phase shift $\Phi_B(f_1)$. After this, the roles are reversed: the second measuring device 20 transmits a second measuring signal at the frequency $f_1$ to the first measuring device 10, which receives it and determines a second partial phase shift $\Phi_A(f_1)$.

After this, during the second guard time, the frequency is moved by $\Delta_1$ to the frequency $f_2$, and the respective measurements are repeated at this frequency.

After this, during the third guard time, the local oscillator frequency is shifted by $\Delta_2$ to the frequency $f_3$. Then the measurements are repeated at this frequency.

A time difference between performing the first measurement and the second measurement is $T_1$, while a time difference between performing the second measurement and the third measurement is $T_2$.

After finishing these six measurements at three different frequencies, optionally, further measurements at different frequency points and time points can be performed in order to increase accuracy.

Finally, after finishing the measurement phase, the measurement results are transmitted to the first measuring device 10 so that the first measuring device 10 can perform the range calculations. These calculations are then performed in the measuring phase labeled as "compute distance and velocity."

Figure 5:
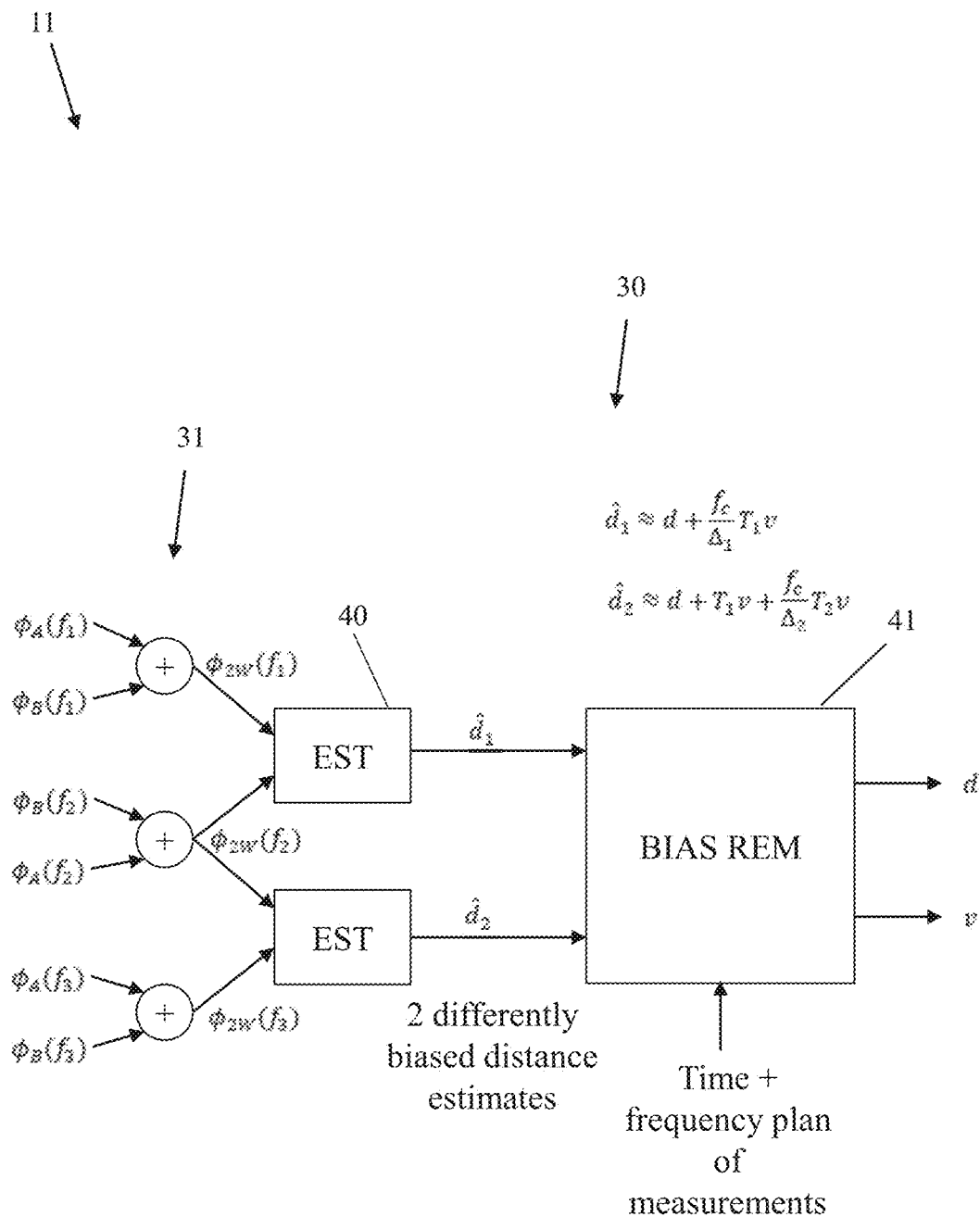
FIG. 5 shows a detail of a fifth embodiment of the measuring system, according to an example embodiment.

In FIG. 5, further details of an embodiment of the measuring system are shown. Here, further details of the inner workings of the first measuring device 10, and particularly of the digital processor 11 are shown. The digital processor 11 here includes the phase difference calculator 31, connected to the range/velocity calculator 30. The range/velocity calculator 30 includes a distance estimator 40 connected to a bias remover 41.

As described with respect to FIG. 4, a first partial phase shift $\Phi_A(f_1)$ and a second partial phase shift $\Phi_B(f_1)$ are determined at a first frequency $f_1$, a third partial phase shift $\Phi_A(f_2)$ and a fourth partial phase shift $\Phi_B(f_2)$ are determined at a second frequency $f_2$, and finally a fifth partial phase shift $\Phi_A(f_3)$ and a sixth partial phase shift $\Phi_B(f_3)$ are determined at a third frequency $f_3$.

These values are handed to the phase difference calculator 31 by the phase determiner 33. The phase difference calculator 31 determines a first phase shift $\Phi_{2W}(f_1)$ by adding the first partial phase shift $\Phi_A(f_1)$ to the second partial phase shift $\Phi_B(f_1)$.

The phase difference calculator 31 is moreover configured to determine a second phase shift $\Phi_{2W}(f_2)$ by adding the third partial phase shift $\Phi_B(f_2)$ to the fourth partial phase shift $\Phi_A(f_2)$.

Moreover, the phase difference calculator 31 is configured to determine a third phase shift $\Phi_{2W}(f_3)$ by adding the fifth partial phase shift $\Phi_A(f_3)$ to the sixth partial phase shift $\Phi_B(f_3)$.

By summing the partial phase shifts, any fine synchronization error is cancelled.

The phase difference calculator is then configured to calculate a first phase difference $\Delta_{\Phi 1}$ between the first phase shift $\Phi_{2W}(f_1)$ and the second phase shift $\Phi_{2W}(f_2)$.

The phase difference calculator is moreover configured to calculate a second phase difference $\Delta_{\Phi 2}$ between the second phase shift $\Phi_{2W}(f_2)$ and the third phase shift $\Phi_{2W}(f_3)$.

Also a normalization and scaling may be performed by the distance estimator 40.

The first phase shift $\Delta_{\Phi 1}$ and the second phase shift $\Delta_{\Phi 2}$ are then handed on to the distance estimator 40. The distance estimator 40 determines a first biased distance estimate as follows:

$$\hat{d}_1 = \frac{C_0}{-4\pi\Delta_f}\Delta_{\phi_1}$$

and determines a second biased distance estimate as follows:

$$\hat{d}_2 = \frac{C_0}{-4\pi\Delta_f}\Delta_{\phi_2}$$

wherein, $\hat{d}_1$ is the first biased distance estimate, $\hat{d}_2$ is the second biased distance estimate, $\Delta f$ is a frequency spacing between the first frequency and the second frequency as well as between the second frequency and the third frequency, $C_0$ is the speed of light in vacuum, $\Delta_{\Phi 1}$ is the first phase difference, $\Delta_{\Phi 2}$ is the second phase difference.

These biased distance estimates include the correct distance but also an error due to velocity.

Since it is known that the first biased distance estimate follows the following equation:

$$\hat{d}_1 \approx d + \frac{f_c}{\Delta_1}T_1 V$$

and the second biased distance estimate follows the following equation:

$$\hat{d}_2 \approx d + T_1 V + \frac{f_c}{\Delta_2}T_2 V$$

and since the time and frequency plan of the measurements is known, because $T_1$, $T_2$, $\Delta_1$ and $\Delta_2$ are known, an equation system can be set up and solved for the distance d and the velocity v. This results in the following:

$$d \approx \frac{\left(T_1 + \frac{f_c}{\Delta_2}T_2\right)\hat{d}_1 - \frac{f_c}{\Delta_1}T_1\hat{d}_2}{T_1 + \frac{f_c}{\Delta_2}T_2 - \frac{f_c}{\Delta_1}T_1}$$

$$v \approx \frac{\hat{d}_2 - \hat{d}_1}{T_1 + \frac{f_c}{\Delta_2}T_2 - \frac{f_c}{\Delta_1}T_1}$$

wherein, d is the unbiased distance at the start of the measurement procedure, v is the velocity, $f_c$ is a carrier frequency, $T_1$ is a time difference between measuring at the first frequency and at the second frequency, $T_2$ is a time difference between measuring at the second frequency and at the third frequency, $\Delta_1$ is a difference of the first frequency and the second frequency, and $\Delta_2$ is a difference of the second frequency and the third frequency.

The velocity and distance can be calculated separately, removing errors due to velocity.

It should be understood that the approach described above may be partially simplified. For example, a larger number of measurements at a larger number of frequency points and time points can be performed in order to increase accuracy. With these additional measurements and frequency points, the equation system includes more equations than unknown variables, an error minimization or matching can be performed to find the best possible velocity and distance.

Also, so far, the approach was described using continuous wave measurement signals. In practice though, in-phase/quadrature-signals (I/Q-signals) can be used. This may help in multipath environments, since when using payload-comprising symbols, the signals traversing the different propagation paths can be separated. Reflections can thereby be suppressed. Here, all measurements are obtained using a single ranging procedure. However, they could be obtained from multiple ranging procedures.

Figure 6:
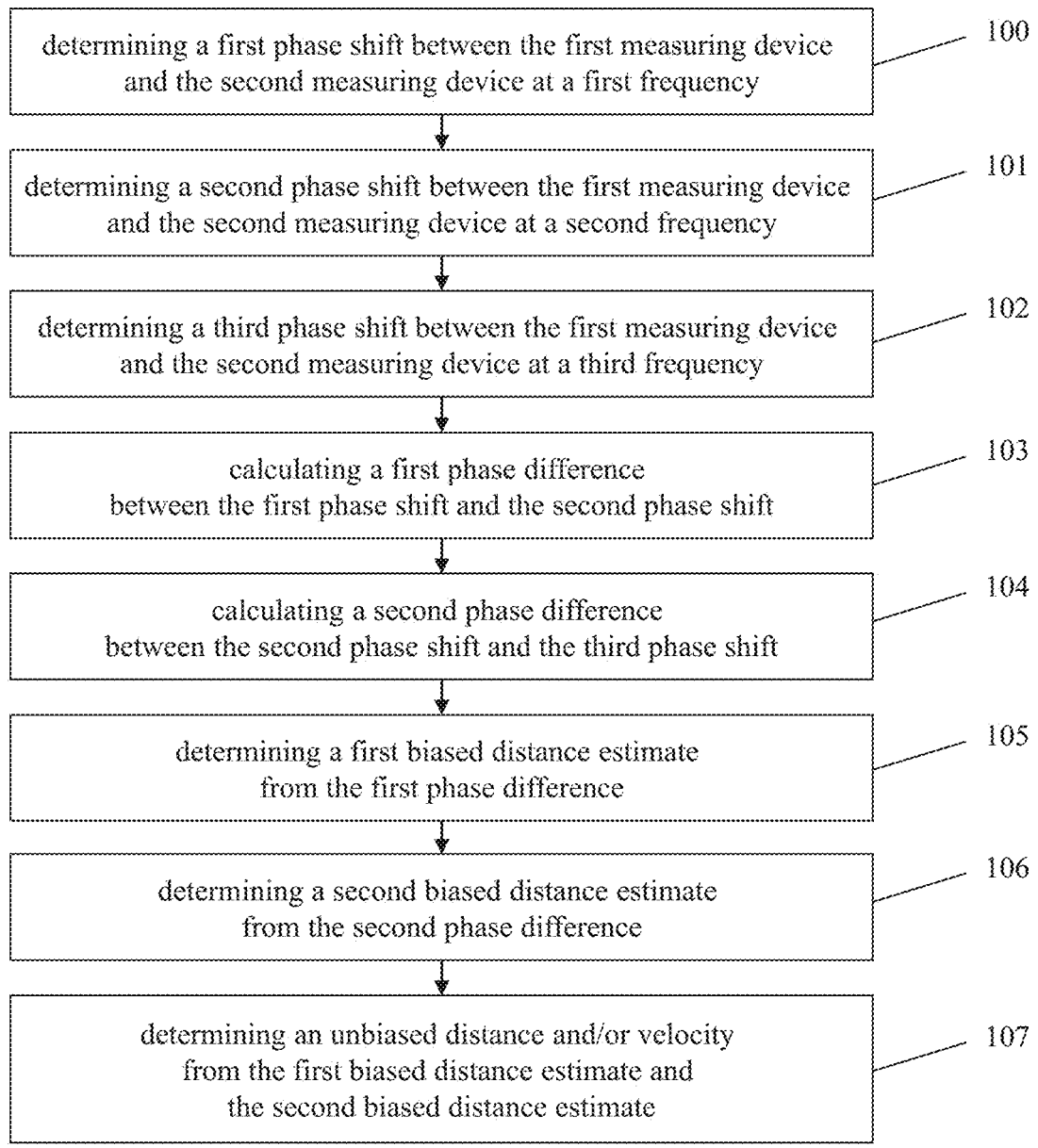
FIG. 6 shows an embodiment of the measuring method, according to an example embodiment.

FIG. 6 depicts an embodiment of a measuring method.

In a first step 100, a first phase shift between a first measuring device and a second measuring device is determined at a first frequency.

In a second step 101, a second phase shift between the first measuring device and the second measuring device is determined at a second frequency.

In a third step 102, a third phase shift between the first measuring device and the second measuring device is determined at a third frequency.

In a fourth step 103, a first phase difference is calculated between the first phase shift and the second phase shift.

In a fifth step 104, a second phase difference is calculated between the second phase shift and the third phase shift.

In a sixth step 105, a first biased distance estimate is determined from the first phase difference.

In a seventh step 106, a second biased distance estimate is determined from the second phase difference.

In a final eight step 107, an unbiased distance and/or velocity, is determined from the first biased distance estimate and the second biased distance estimate.

It should be noted that the elaborations with regard to the measuring system are also to be understood as disclosed with regard to the measuring method, while at the same time the elaborations regarding the measuring method are to be understood as disclosed in regard to the measuring system.

The present disclosure is not limited to the examples and in particular is not limited to specific times of measuring signals. Also a limitation to a specific number of frequency points and time points at which measurements are performed, is not present. The characteristics of the exemplary embodiments can be used in combination.

It should be noted regarding notation that a vector is by default column-vector, unless specified otherwise, a vector will be denoted by a bold lower-case, a matrix in bold upper-case, scalars are denoted using none-bold letter, scalar-variables are in lower case, and scalar-constants are in upper-case.

LIST OF ABBREVIATIONS

CFO Carrier Frequency Offset
EVD Eigen Value Decomposition
FPU Floating Point Unit
HW Hardware
MCU Microcontroller Unit
MCPD Multi-Carrier Phase Difference
NRB Narrowband
RSSI Received Signal Strength Indicator
RTB Ranging Test Board
RX Receive
SW Software
TX Transmit
LOS Line of sight While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

What is claimed is:

1. A measuring system comprising a first measuring device and a second measuring device,
    wherein the measuring system is configured to, between the first measuring device and the second measuring device:
    determine a first phase shift at a first frequency, wherein determining the first phase shift comprises the first measuring device transmitting a first measuring signal at the first frequency and the second measuring device transmitting a second measuring signal at the first frequency;
    determine a second phase shift at a second frequency, wherein determining the second phase shift comprises the first measuring device transmitting a third measuring signal at the second frequency and the second measuring device transmitting a fourth measuring signal at the second frequency;
    determine a third phase shift at a third frequency, wherein determining the third phase shift comprises the first measuring device transmitting a fifth measuring signal at the third frequency and the second measuring device transmitting a sixth measuring signal at the third frequency;
    wherein the first measuring device comprises:
        a phase difference calculator, configured
            to calculate a first phase difference between the first phase shift and the second phase shift, and
            to calculate a second phase difference between the second phase shift and the third phase shift;
        wherein the system additionally comprises a range/velocity calculator configured to determine an unbiased distance and/or velocity between the first measuring device and the second measuring device based on the first phase difference and the second phase difference.

2. The measuring system according to claim 1, wherein the range/velocity calculator is additionally configured to:
    determine a first biased distance estimate from the first phase difference; and
    determine a second biased distance estimate from the second phase difference;
    wherein the range/velocity calculator determining the unbiased distance and/or velocity between the first measuring device and the second measuring device comprises determining the unbiased distance and/or velocity from the first biased distance estimate and the second biased distance estimate.

3. The measuring system according to claim 2,
    wherein the range/velocity calculator comprises a distance estimator, configured to:
    determine the first biased distance estimate, as follows:

$$\hat{d}_1 = \frac{C_0}{-4\pi\Delta_f}\Delta_{\phi_1};$$

and/or
    determine the second biased distance estimate, as follows:

$$\hat{d}_2 = \frac{C_0}{-4\pi\Delta_f}\Delta_{\phi 2}$$

wherein
$\hat{d}_1$ is the first biased distance estimate,
$\hat{d}_2$ is the second biased distance estimate,
$\Delta f$ is a frequency spacing between the first frequency and the second frequency as well as between the second frequency and the third frequency,
$C_0$ is the speed of light in vacuum,
$\Delta_{\phi 1}$ is the first phase difference, and
$\Delta_{\phi 2}$ is the second phase difference.

4. The measuring system according to claim 3, wherein the range/velocity calculator comprises a bias remover, configured to determine the unbiased distance and/or velocity from the first biased distance estimate and the second biased distance estimate, by solving the following equations for unbiased distance and velocity:

$$\hat{d}_1 \approx d + \frac{f_c}{\Delta_1}T_1 V, \text{ and}$$

$$\hat{d}_2 \approx d + T_1 V + \frac{f_c}{\Delta_2}T_2 V,$$

wherein
d is the unbiased distance at a start of measuring the signals,
v is the velocity,
$f_c$ is a carrier frequency,
$T_1$ is a time difference between measuring at the first frequency and at the second frequency,
$T_2$ is a time difference between measuring at the second frequency and at the third frequency,
$\Delta_1$ is a difference of the first frequency and the second frequency,
$\Delta_2$ is a difference of the second frequency and the third frequency,
$\hat{d}_1$ is the first biased distance estimate, and
$\hat{d}_2$ is the second biased distance estimate.

5. The measuring system according to claim 4,
wherein the bias remover is configured to determine the unbiased distance and/or velocity from the first biased distance estimate and the second biased distance estimate, as follows:

$$d \approx \frac{\left(T_1 + \frac{f_c}{\Delta_2}T_2\right)\hat{d}_1 - \frac{f_c}{\Delta_1}T_1\hat{d}_2}{T_1 + \frac{f_c}{\Delta_2}T_2 - \frac{f_c}{\Delta_1}T_1}$$

$$v \approx \frac{\hat{d}_2 - \hat{d}_1}{T_1 + \frac{f_c}{\Delta_2}T_2 - \frac{f_c}{\Delta_1}T_1}.$$

6. The measuring system according to claim 2,
wherein the measuring system is configured to, between the first measuring device and the second measuring device, determine a plurality phase shifts, each at a different frequency,
wherein the phase difference calculator is configured to calculate a plurality of phase differences, each of two frequency-adjacent phase shifts of the plurality phase shifts, and wherein the range/velocity calculator is configured to calculate a plurality of biased distance estimates, each from one of the plurality of calculated phase differences.

7. The measuring system according to claim 6,
wherein the bias remover is configured to determine the unbiased distance and/or velocity from the plurality of biased distance estimates, by performing an error minimization or a matching algorithm.

8. The measuring system according to claim 1, wherein the measuring system is configured to determine the first phase shift, the second phase shift, and the third phase shift as roundtrip phase shifts between the first measuring device and the second measuring device.

9. The measuring system according to claim 1, wherein determining the first phase shift comprises:
the first measuring device transmitting the first measuring signal at the first frequency to the second measuring device;
the second measuring device determining a first partial phase shift, the first measuring signal has undergone during transmission;
the second measuring device transmitting the second measuring signal at the first frequency to the first measuring device;
the first measuring device determining a second partial phase shift, the second measuring signal has undergone during transmission;
the phase difference calculator is configured to determine the first phase shift by adding the first partial phase shift and the second partial phase shift; and/or
wherein determining the second phase shift comprises:
the first measuring device transmitting the third measuring signal at the second frequency to the second measuring device;
the second measuring device determining a third partial phase shift, the third measuring signal has undergone during transmission;
the second measuring device transmitting the fourth measuring signal at the second frequency to the first measuring device;
the first measuring device determining a fourth partial phase shift, the fourth measuring signal has undergone during transmission;
the phase difference calculator determining the second phase shift by adding the third partial phase shift and the fourth partial phase shift; and/or
wherein determining the third phase shift comprises, the first measuring device transmitting the fifth measuring signal at the third frequency to the second measuring device,
the second measuring device determining a fifth partial phase shift, the fifth measuring signal has undergone during transmission,
the second measuring device transmitting the sixth measuring signal at the third frequency to the first measuring device,
the first measuring device determining a sixth partial phase shift, the sixth measuring signal has undergone during transmission; and
the phase difference calculator determining the third phase shift by adding the fifth partial phase shift and the sixth partial phase shift.

10. The measuring system according to claim 9,
wherein, for determining the first phase shift, the second measuring device is configured to transmit the second partial phase shift to the first measuring device, and/or wherein, for determining the second phase shift, the second measuring device is configured to transmit the fourth partial phase shift to the first measuring device, and/or wherein, for determining the third phase shift, the second measuring device is configured to transmit the sixth partial phase shift to the first measuring device.

11. The measuring system according to claim 10,
wherein the first measuring device is configured to transmit the third measuring signal a first time period after transmitting the first measuring signal; and/or
wherein the second measuring device is configured to transmit the fourth measuring signal the first time period after transmitting the second measuring signal; and/or wherein the first measuring device is configured to transmit the fifth measuring signal a second time period after transmitting the third measuring signal; and/or
wherein the second measuring device is configured to transmit the sixth measuring signal the second time period after transmitting the fourth measuring signal.

12. The measuring system according to claim 9,
wherein first measuring signal and/or the second measuring signal and/or the third measuring signal are continuous wave signals or inphase/quadrature, I/O, signals.

13. The measuring system according to claim 1,
wherein the measuring system is configured to step through different frequencies for determining a plurality phase shifts by a pre-defined or user-selectable frequency pattern, and
wherein the frequency pattern is a monotonous frequency rise, or a monotonous frequency fall, or an alternation between higher and lower frequencies, or a pseudorandom frequency order.

14. A ranging method, comprising the following steps:
determining a first phase shift at a first frequency, between a first measuring device and a second measuring device, wherein determining the first phase shift comprises transmitting a first measuring signal at the first frequency from the first measuring device and transmitting a second measuring signal at the first frequency from the second measuring device;
determining a second phase shift at a second frequency, between the first measuring device and the second measuring device, wherein determining the second phase shift comprises transmitting a third measuring signal at the second frequency from the first measuring device and transmitting a fourth measuring signal at the second frequency from the second measuring device;
determining a third phase shift at a third frequency, between the first measuring device and the second measuring device, wherein determining the third phase shift comprises transmitting a fifth measuring signal at the third frequency from the first measuring device and transmitting a sixth measuring signal at the third frequency from the second measuring device;
calculating a first phase difference between the first phase shift and the second phase shift;
calculating a second phase difference between the second phase shift and the third phase shift;
determining a first biased distance estimate from the first phase difference; and
determining a second biased distance estimate from the second phase difference.

15. The ranging method according to claim 14, further comprising:

determining an unbiased distance and/or velocity from the first biased distance estimate and the second biased distance estimate.

16. The ranging method according to claim 14, wherein determining the first phase shift, the second phase shift, and the third phase shift comprises determining the first phase shift, the second phase shift, and the third phase shift as roundtrip phase shifts between the first measuring device and the second measuring device.

17. The ranging method according to claim 14, wherein determining the first phase shift comprises:
transmitting the first measuring signal at the first frequency from the first measuring device to the second measuring device;
determine a first partial phase shift that the first measuring signal has undergone during transmission;
transmitting the second measuring signal at the first frequency from the second measuring device to the first measuring device;
determining a second partial phase shift that the second measuring signal has undergone during transmission; and
determining the first phase shift by adding the first partial phase shift and the second partial phase shift.

18. The ranging method according to claim 17, wherein determining the second phase shift comprises:
transmitting the third measuring signal at the second frequency from the first measuring device to the second measuring device;
determining a third partial phase shift that the third measuring signal has undergone during transmission;
transmitting the fourth measuring signal at the second frequency from the second measuring device to the first measuring device;
determining a fourth partial phase shift that the fourth measuring signal has undergone during transmission;
determining the second phase shift by adding the third partial phase shift and the fourth partial phase shift.

19. The ranging method according to claim 14, further comprising:
determining the first biased distance estimate, as follows:

$$\hat{d}_1 = \frac{C_0}{-4\pi\Delta_f}\Delta_{\phi_1};$$

and/or
determining the second biased distance estimate, as follows:

$$\hat{d}_2 = \frac{C_0}{-4\pi\Delta_f}\Delta_{\phi_2}$$

wherein
$\hat{d}_1$ is the first biased distance estimate,
$\hat{d}_2$ is the second biased distance estimate,
$\Delta f$ is a frequency spacing between the first frequency and the second frequency as well as between the second frequency and the third frequency,
$C_0$ is the speed of light in vacuum,
$\Delta_{\phi_1}$ is the first phase difference, and
$\Delta_{\phi_2}$ is the second phase difference.

20. The ranging method according to claim 19, further comprising:

determining a unbiased distance and/or velocity from the first biased distance estimate and the second biased distance estimate, by solving the following equations for unbiased distance and velocity:

$$\hat{d}_1 \approx d + \frac{f_c}{\Delta_1} T_1 V, \text{ and}$$

$$\hat{d}_2 \approx d + T_1 V + \frac{f_c}{\Delta_2} T_2 V,$$

wherein
- d is the unbiased distance at a start of measuring the signals,
- v is the velocity,
- $f_c$ is a carrier frequency,
- $T_1$ is a time difference between measuring at the first frequency and at the second frequency,
- $T_2$ is a time difference between measuring at the second frequency and at the third frequency,
- $\Delta_1$ is a difference of the first frequency and the second frequency,
- $\Delta_2$ is a difference of the second frequency and the third frequency,
- $\hat{d}_1$ is the first biased distance estimate, and
- $\hat{d}_2$ is the second biased distance estimate.

* * * * *